June 10, 1952  G. B. GUTHRIE  2,599,910

TOOL FOR FORMING DINNERWARE

Filed May 9, 1950  2 SHEETS—SHEET 1

INVENTOR.
George B. Guthrie

BY

Webb, Mackey & Binden,
HIS ATTORNEYS

June 10, 1952 — G. B. GUTHRIE — 2,599,910
TOOL FOR FORMING DINNERWARE
Filed May 9, 1950 — 2 SHEETS—SHEET 2
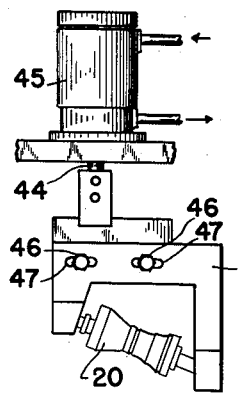
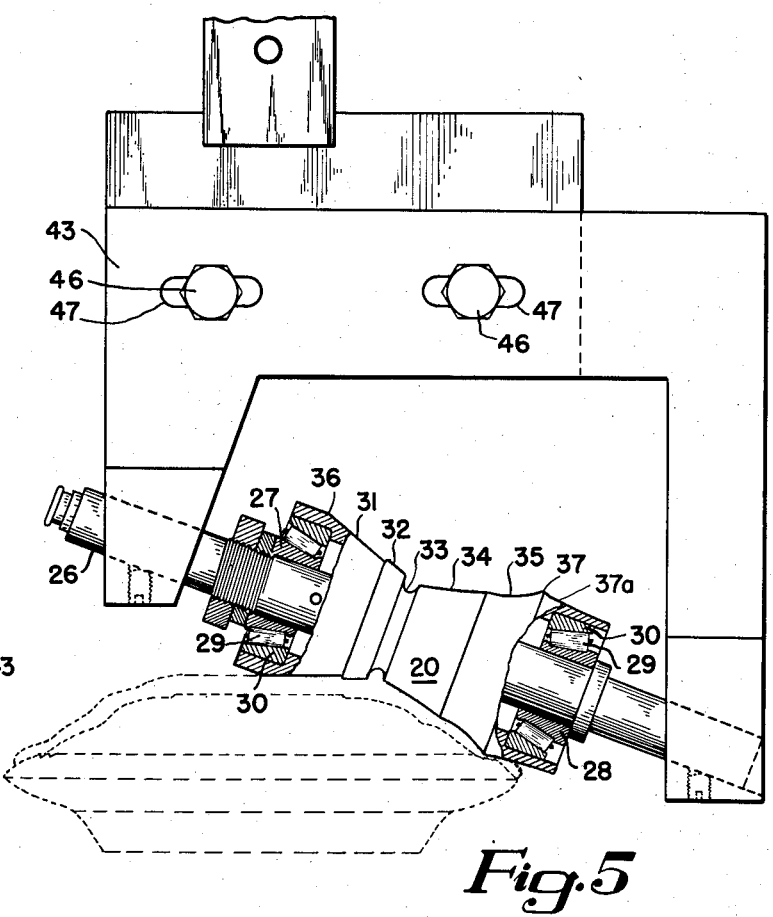
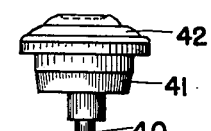
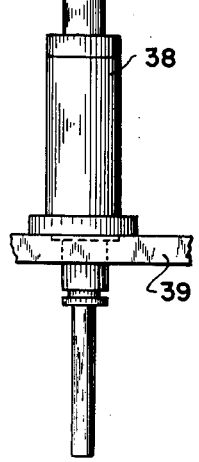
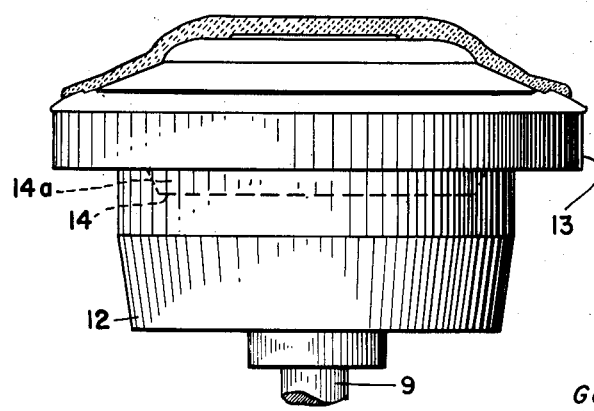
INVENTOR.
George B. Guthrie
BY
HIS ATTORNEYS Patented June 10, 1952

2,599,910

UNITED STATES PATENT OFFICE 2,599,910

TOOL FOR FORMING DINNERWARE

George B. Guthrie, East Palestine, Ohio, assignor to The Hall China Co., East Liverpool, Ohio, a corporation of Ohio Application May 9, 1950, Serial No. 161,008

2 Claims. (Cl. 25—26)

This application relates to a tool for forming dinnerware which may be used on a standard jigger to form dinnerware. It may be used on manual or automatic jiggers and is particularly useful for forming difficult shapes which have not heretofore been successfully formed on jiggers.

Jiggers for forming dinnerware have been used for many years. Broadly speaking, they comprise a support on which a plaster of Paris mould shaped to the desired contour may be rotated. A bat of clay is thrown or pressed on to the mould so that the clay assumes the shape of the face of the ware and the mould is rotated. A contour jiggering tool is pressed down against the clay on the mould to form the "foot" side of the piece. The contour forming tool is a steel plate cut to the desired shape of the bottom or "foot" side of a piece of ware and backed by a strip of wood.

In hand operated machines the contour jiggering tool is carried on a lever which is pivoted by hand to press the tool against the clay. In various automatic jiggers a rotating mould is brought up against a tool or a tool rotating about a vertical axis may be brought down against a stationary mould.

Although contour forming tools have been used for many years they have not been wholly satisfactory, particularly for forming oval shapes. It is believed that this is due to the fact that they do not apply a uniform pressure to all parts of the clay. In the forming of dinnerware, it has been found that if the clay is subjected to pressure before it is dried and fired shrinkage of the clay during firing is slightly decreased. However, if some parts of a particular piece are pressed more than other parts unequal shrinkage will occur and the piece will go crooked or crack during firing.

Also in order to prevent sticking of the clay and "balling up" of the clay in advance of the steel plate, the clay surface is kept wet. This wet surface tends to pick up particles of dirt during forming and drying with the result that a rough bottom surface is produced on the finished ware. Further, these tools have to be sharpened about once a day.

To avoid these difficulties and to increase production it has heretofore been proposed to replace the contour forming tool with a roller. Such rollers have been in the general form of cones or straight cylinders where the center of the ware is formed. The roller is brought down against the clay on the mould so that the cone or cylinder contacts the piece. These rollers, however, have not been successful in that a large percentage of oval ware formed by them cracks and goes crooked during firing which indicates that these rollers do not apply a uniform pressure throughout the piece. The rollers also tend to "ball up" the clay near the center of the piece particularly in the case of oval ware.

I have developed a tool for forming dinnerware which is in the form of a roller which can be used on either manual or automatic jiggers and which produce highly satisfactory ware. It is particularly useful in the forming of oval shaped ware. For example, heretofore about 40% of oval ware formed on a jigger with a contour jiggering tool goes crooked during firing. In actual production only 10% of the oval ware formed with my tool has gone crooked during firing.

In the accompanying drawings I have illustrated certain present preferred embodiments of my invention in which—

Figure 3 is an elevation view of a mould and support therefor which may be used in the jigger shown in Figures 1 and 2;

Figure 4 is a partial elevation view of an automatic jigger; and

Figure 5 is a partial elevation view showing a portion of the machine shown in Figure 4 with certain parts broken away for purposes of illustration.

Figure 2:
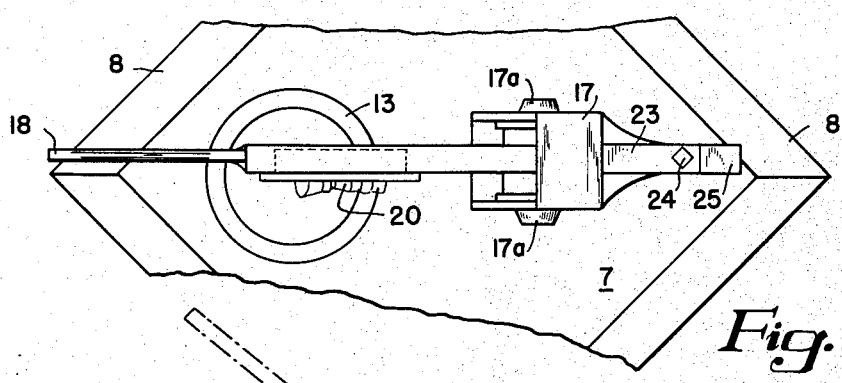
Figure 2 is a partial plan view of the machine shown in Figure 1.
Figure 1:
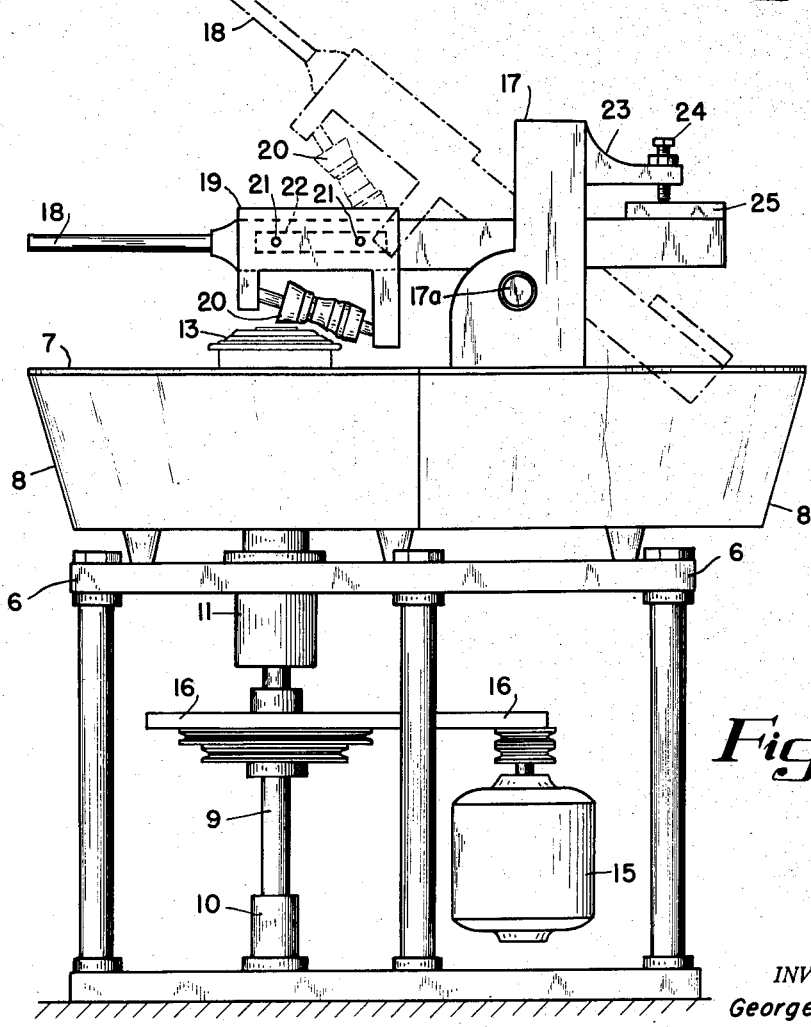
Figure 1 is a side elevation of a hand-operated jigger equipped with my invention.

Figure 1 of the drawings shows a standard hand-operated jigger which comprises a pedestal 6 which supports a square-shaped trough 7 having sloping sides 8. A vertical shaft 9 mounted in bearings 10 and 11 passes through the bottom of the trough 7 and extends upwardly within the trough. As shown in Figure 3 this shaft 9 has at its upper end a head 12 which can hold a mould 13, the mould being made of plaster of Paris. The head 12 has a central depression 14 in its top surface and the mould has a downwardly extending lug 14a which fits into the depression so that the head 12 firmly grips the mould. An electric motor 15 rotates the shaft 9 by means of a belt drive 16.

A pedestal 17 supported in the trough 7 pivotally carries about a shaft 17a a lever 18. The longer arm of this lever carries a bracket 19 which in turn supports a forming tool 20. The position of the bracket 19 along the lever 18 can be adjusted by bolts 21 and slots 22.

When the machine is not used the lever 18 is in the position shown in the dot and dash lines in Figure 1. After a piece of clay has 2,599,910

3 been pressed or thrown on to a mould 13 and the mould has been placed on the head 12 of the shaft 9 as shown in Figure 1, a workman grasps the outer end of the lever 18 and pulls the forming roller 20 down against the clay on the mould. As shown in Figure 1 and in an enlarged scale in Figure 5, the surface of the roller has the contour desired in the particular article being formed and this shape is impressed on the clay as the mould rotates under the roller 20. The pedestal 17 has a bracket 23 into which a bolt 24 is threaded. The end of the lever 18 opposite to the end grasped by the workman carries a plate 25 which strikes the bolt 24 when the lever is pulled down to press the roller against the clay on the mould. The distance between the mould 13 and the roller 20 and thereby the thickness of the piece being formed can thus be controlled by adjusting the bolt 24.

The roller 20 shown in Figure 1 is shown on an enlarged scale in Figure 5 in connection with an automatic jigger. As appears in Figure 5 the roller is mounted on a shaft 26 which in turn is mounted in a bracket which can be the bracket 19 of Figure 1 or part of an automatic jigger which will be hereinafter described. The shaft 26 carries inner raceways 27 and 28 for roller bearings 29, the raceways being shrunk on the shaft and each end of the roller carries outer raceways 30. As heretofore pointed out the sides of the rollers have a contour of the shape desired in the finished piece. Thus the flat portions 31 and 32 press out the base of the plate, the curved portion 33 shapes the foot, and the curved portions 34 and 35 shape the bottom sides of the piece. The relation between the mould 13 and the roller 20 can be seen by comparing Figures 3 and 5. In Figure 3 a body of clay is shown on the mould before jiggering and in Figure 5 the mould is shown in dotted lines in proper position for forming the bottom of the piece. Thus it will be seen that the roller contacts the clay between the points indicated by the reference numbers 36 and 37 and I have found that it is important that the diameter of the roller at these points shall be approximately the same. By so doing the pressure on the clay at the center of the piece and at the edges is substantially equalized. In this connection it will be noted that the shaft 26 must be mounted in the bracket 19 at such an angle that when the lever 18 is pulled down the distance between the roller and the mould will be uniformly proportional to the amount of clay between them at any particular point. At the point 37 the roller comes very close (approximately ¹⁄₆₄ of an inch) to the mould and thins out the clay so that during drying the clay breaks at that point and the edge of the ware is formed ready for "finishing" prior to firing. The roller also has a reduced portion 37a beyond the point 37 to accumulate excess clay.

It will also be noted that at the point 36 the roller contacts the clay at the center of rotation of the clay body. It is also important that the surface of the roller between the point 36 and the portion 33 of the roller which forms the foot slope inwardly, that is, the roller should decrease in diameter from the point where it contacts the center of the piece and the point where the foot is formed. If this is done, the surface between these two points, i. e., the surfaces 31 and 32 in Figure 5, tend to force the clay from the center of the piece towards the foot when the roller and mould are being pressed toward each other. This prevents "balling up" of clay at the center

4 of the plate and forces excess clay towards the foot where extra clay is needed. Forcing clay towards the foot is particularly important in the case of oval ware which has not heretofore been made by rollers because the clay was not removed from the center.

In Figure 4 I have schematically illustrated an automatic jigger embodying my invention. In this machine the mould does not rotate but the forming tool rotates about the mould. At intervals timed in relation to other processing steps a mould carrying clay pressed on it is lifted up against a roller and the roller is rotated about the mould. A cylinder 38 supported on a base 39 lifts a piston 40 which has a head 41 which in turn supports a mould 42. A roller 20 is carried in a bracket 43 which in turn is secured to a shaft 44 of a hydraulic motor 45. When the mould 42 is lifted against the roller 20, the motor 45 is energized to rotate the bracket 43 and thereby carry the roller 20 around the mould. As shown in Figures 4 and 5 the bracket 43 can be adjusted laterally by means of bolts 46 and slots 47 in the bracket.

As stated above the tool for forming dinnerware which I have invented produces very satisfactory results particularly in the forming of oval dinnerware. Whereas heretofore about 40% of oval pieces formed on a jigger have gone crooked during firing, my tool has reduced this loss to approximately 10%. I can use oil between the surface of the roller and the clay and therefore the surface of the clay after forming is comparatively dry. It results that the formed piece does not tend to pick up dirt and a smooth highly polished surface results. Contour formed tools heretofore used have had to be sharpened at least once a day, but my roller requires practically no maintenance. Unlike rollers heretofore used, my roller exerts a uniform pressure on a body of clay being formed and greatly reduces cracking or crooked ware during firing.

While I have described certain present preferred embodiments of my invention, it is to be understood that it may be otherwise variously embodied within the scope of the following claims.

I claim:

1. In a jigger for forming dinnerware having a central portion, a foot, and an edge portion, said jigger having a mould to support a clay piece to be formed into said dinnerware, a tool for forming the piece, and means for turning the mould and the tool relative to each other and for moving them towards each other, the improvement in the forming tool comprising a roller having a portion in the shape of a truncated cone adapted to contact the clay piece from the central portion of the piece to the foot, and a portion which is inwardly curved adapted to form the foot of the piece, the diameter of the roller where it contacts the central portion of the piece being greater than the diameter of the portion of the roller which forms the foot, the diameter of the roller increasing from the portion which is adapted to form the foot to the edge portion of the clay piece being formed.

2. In a jigger for forming dinnerware having a central portion, a foot, and an edge portion, said jigger having a mould to support a clay piece to be formed into said dinnerware, a tool for forming the piece, and means for turning the mould and the tool relative to each other and for moving them towards each other, the improvement in the forming tool comprising a roller of generally cylindrical shape having a portion adapted to contact the clay piece adjacent the center of the piece, a portion adapted to form the foot of the piece, and a portion adapted to contact the piece adjacent its edge, the diameters of the roller portions adjacent the center and edges of the piece being of substantially the same diameter, and the diameter of the portion forming the foot being less than the diameter of the roller portion adjacent the center of the piece, said roller also having portions adapted to contact the clay piece between the center and the foot and between the foot and the edge.

GEORGE B. GUTHRIE.

REFERENCES CITED

The following references are of record in the file of this patent:

UNITED STATES PATENTS

| Number | Name | Date |
|---|---|---|
| 1,551,728 | Burger | Sept. 1, 1925 |
| 2,455,744 | Emerson | Dec. 7, 1948 |